(12) United States Patent
Zhao et al.

(10) Patent No.: US 12,553,098 B2
(45) Date of Patent: Feb. 17, 2026

(54) FATIGUE-RESISTANT LOAD-BEARING STEEL FOR WIND TURBINE MAIN SHAFT, AND MANUFACTURING METHOD AND USE THEREOF

(71) Applicant: Zenkung Heavy Industry (Jiangsu) Co., Ltd., Wuxi (CN)

(72) Inventors: Zhijie Zhao, Wuxi (CN); Liang Xu, Wuxi (CN); Zhen Yuan, Wuxi (CN); Jia Ju, Wuxi (CN)

(73) Assignee: Zenkung Heavy Industry (Jiangsu) Co., Ltd., Wuxi (CN)

( * ) Notice: Subject to any disclaimer, the term of this patent is extended or adjusted under 35 U.S.C. 154(b) by 0 days.

(21) Appl. No.: 18/880,853

(22) PCT Filed: May 9, 2024

(86) PCT No.: PCT/CN2024/091887
§ 371 (c)(1),
(2) Date: Jan. 3, 2025

(87) PCT Pub. No.: WO2025/156495
PCT Pub. Date: Jul. 31, 2025

(65) Prior Publication Data
US 2025/0257418 A1    Aug. 14, 2025

(30) Foreign Application Priority Data

Jan. 24, 2024    (CN) .......................... 202410095150.9

(51) Int. Cl.
*C21D 9/00*    (2006.01)
*B22D 11/00*   (2006.01)
(Continued)

(52) U.S. Cl.
CPC .......... *C21D 9/0068* (2013.01); *B22D 11/001* (2013.01); *B22D 11/12* (2013.01); *C21C 7/06* (2013.01); *C21C 7/064* (2013.01); *C21C 7/072* (2013.01); *C21C 7/10* (2013.01); *C21D 1/84* (2013.01); *C21D 6/004* (2013.01);
(Continued)

(58) Field of Classification Search
None
See application file for complete search history.

(56) References Cited

FOREIGN PATENT DOCUMENTS

| CN | 113249643 A | 8/2021 |
|---|---|---|
| CN | 115323277 A | 11/2022 |

(Continued)

*Primary Examiner* — Anthony M Liang
(74) *Attorney, Agent, or Firm* — Bayramoglu Law Offices LLC

(57) ABSTRACT

A fatigue-resistant load-bearing steel for a wind turbine main shaft, and a manufacturing method and a use thereof are provided. The manufacturing method includes: step S1, smelting: smelting a raw steel into a molten iron, followed by impurity removal and deoxidation, and adjusting contents of respective components to obtain a casting molten steel; step S2, continuous casting: crystallizing the casting molten steel with an electric pulse, followed by solidification to obtain a continuous casting billet; step S3, rolling: subjecting the continuous casting billet to rough rolling and finish rolling sequentially to obtain a finish-rolled billet; and step S4, post-rolling treatment: slowly cooling and then air-cooling the finish-rolled billet to obtain the fatigue-resistant load-bearing steel.

15 Claims, 1 Drawing Sheet

| (51) | Int. Cl. | |
|---|---|---|
| | B22D 11/12 | (2006.01) |
| | C21C 7/06 | (2006.01) |
| | C21C 7/064 | (2006.01) |
| | C21C 7/072 | (2006.01) |
| | C21C 7/10 | (2006.01) |
| | C21D 1/84 | (2006.01) |
| | C21D 6/00 | (2006.01) |
| | C21D 7/10 | (2006.01) |
| | C21D 8/00 | (2006.01) |
| | C22C 33/06 | (2006.01) |
| | C22C 38/02 | (2006.01) |
| | C22C 38/04 | (2006.01) |
| | C22C 38/06 | (2006.01) |
| | C22C 38/46 | (2006.01) |
| | C22C 38/48 | (2006.01) |
| | C22C 38/50 | (2006.01) |
| | F03D 80/70 | (2016.01) |

(52) U.S. Cl.
CPC ............ *C21D 6/005* (2013.01); *C21D 6/008* (2013.01); *C21D 8/005* (2013.01); *C22C 33/06* (2013.01); *C22C 38/02* (2013.01); *C22C 38/04* (2013.01); *C22C 38/06* (2013.01); *C22C 38/46* (2013.01); *C22C 38/48* (2013.01); *C22C 38/50* (2013.01); *F03D 80/703* (2023.08); *F05B 2230/21* (2013.01); *F05B 2240/50* (2013.01)

(56) References Cited

FOREIGN PATENT DOCUMENTS

| CN | 116254390 A | 6/2023 | |
|---|---|---|---|
| CN | 117604396 A | 2/2024 | |
| JP | 2003064442 A | 3/2003 | |
| JP | 2020059881 A * | 4/2020 | |
| WO | WO-2023165068 A1 * | 9/2023 | ........... C21D 8/0226 |

* cited by examiner

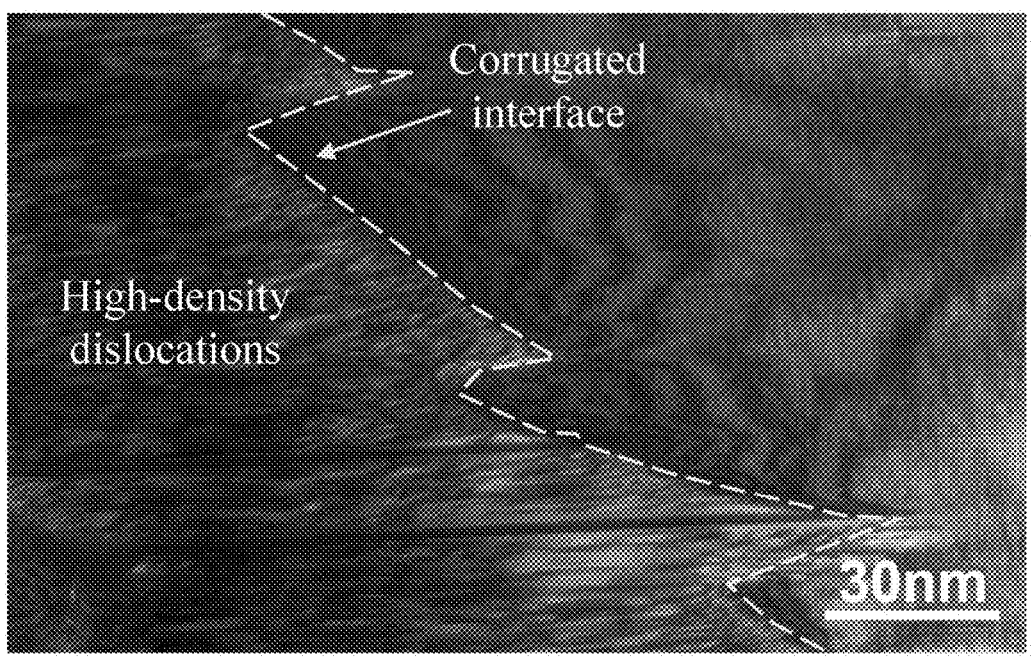

FATIGUE-RESISTANT LOAD-BEARING STEEL FOR WIND TURBINE MAIN SHAFT, AND MANUFACTURING METHOD AND USE THEREOF

CROSS-REFERENCE TO THE RELATED APPLICATIONS

This application is the national phase entry of International Application No. PCT/CN2024/091887, filed on May 9, 2024, which is based upon and claims priority to Chinese Patent Application No. 202410095150.9, filed on Jan. 24, 2024, the entire contents of which are incorporated herein by reference.

TECHNICAL FIELD

The present disclosure relates to the technical field of metallurgical steels, and in particular to a fatigue-resistant load-bearing steel for a wind turbine main shaft, and a manufacturing method and a use thereof.

BACKGROUND

Wind turbine load-bearing components are an integral part of a wind turbine generator system, and are mainly used for load-bearing and fixing of a majority of components of the wind turbine generator system. These wind turbine load-bearing components include a tower barrel, a nacelle, a hub, a blade, and the like. The manufacture and design of these wind turbine load-bearing components must meet specified requirements to ensure the safe and stable operations of the wind turbine generator system. Generally, the wind turbine load-bearing components must have properties such as high strength, corrosion resistance, and fatigue resistance, and also need to have excellent machinability and weldability. The manufacture of these wind turbine load-bearing components requires strict process flow and quality control to ensure the quality and reliability of these wind turbine load-bearing components.

In recent years, the continuous increase of powers of the wind turbine generator systems and sizes of structures such as tower barrels makes the manufacture and design of the wind turbine load-bearing components become increasingly difficult. In addition, due to complicated and changeable operating environments of the wind turbine generator systems, the wind turbine load-bearing components are subjected to extremely complex loads and stresses. Therefore, in order to ensure the safety and stability of the wind turbine generator system, higher requirements have been placed on the steel for a wind turbine main shaft.

However, the wind turbine load-bearing components are continuously subjected to the periodic actions of the wind loads during operations of the wind turbine generator system, leading to the fatigue problems of the wind turbine load-bearing components due to vibration, which has a great impact on the stability and service life of the wind turbine generator system. Currently, the wind-induced fatigue in the wind turbine is caused mainly due to the following two reasons. 1. Due to structural characteristics and design issues of the wind turbine generator system, such as unreasonable structures, insufficient stiffness, and loose connections of the wind turbine load-bearing components, the wind turbine generator system is subjected to the wind load during operation and is prone to vibration and fatigue. 2. Because the wind turbine generator system operates in complicated and changeable environments and changes in parameters such as the wind direction, the wind speed, and the wind load all will impact the wind turbine generator system, the wind turbine generator system is continuously subjected to an impact load during operation, thereby accelerating the fatigue of the wind turbine load-bearing components and seriously affecting the service life and safety of the wind turbine generator system. In view of this, the present disclosure provides a fatigue-resistant load-bearing steel for a wind turbine main shaft, and a manufacturing method and a use thereof.

SUMMARY

In order to solve the problem in the prior art that the steel for wind turbine load-bearing components is prone to fatigue under the action of an external force in the operating environment, the present disclosure provides a fatigue-resistant load-bearing steel for a wind turbine main shaft, and a manufacturing method and a use thereof.

In order to achieve the above objective, the present disclosure adopts the following technical solutions.

A first aspect of the present disclosure provides a manufacturing method of a fatigue-resistant load-bearing steel for a wind turbine main shaft, including the following steps:
  step S1, smelting: smelting a raw steel into a first molten iron, followed by impurity removal and deoxidation, and adjusting contents of respective components to obtain a casting molten steel;
  step S2, continuous casting: crystallizing the casting molten steel with an electric pulse, followed by solidification to obtain a continuous casting billet;
  step S3, rolling: subjecting the continuous casting billet to rough rolling and finish rolling sequentially to obtain a finish-rolled billet; and
  step S4, post-rolling treatment: slowly cooling and then air-cooling the finish-rolled billet to obtain the fatigue-resistant load-bearing steel.

In some embodiments, in the step S1, the casting molten steel includes the following respective components in the following contents: Al: 0.12% to 0.15%, Si: 0.35% to 0.60%, Cr: 1.62% to 2.35%, V: 0.15% to 0.21%, Ti: 0.78% to 1.21%, and Nb: 0.27% to 0.32%.

The casting molten steel of the present disclosure includes the following components in mass percentage: V: 0.15% to 0.21%, Ti: 0.78% to 1.21%, Nb: 0.27% to 0.32%, and Cr: 1.62% to 2.35%. V, Ti, Nb, and Cr are all alloying elements with lower environment-sensitive embedding energies. From the perspective of thermodynamics, V, Ti, Nb, and Cr are liable to segregate at defects such as dislocation lines and interfaces, and thus a Cottrell atmosphere is very easily formed, which plays a dragging role in the grain boundary migration.

In some embodiments, in the step S1, the casting molten steel includes the following respective components in the following contents: C: 0.15% to 0.20%, Ni: 0.39% to 0.48%, Mn: 0.18% to 0.23%, and Fe: the balance.

In some embodiments, the steps of the impurity removal and the deoxidation, and adjusting the contents of the respective components in the step S1 include the following steps:
  step S1.1, pre-desulfurizing the raw steel by a Kambara Reactor (KR) stirring process at 1,575° C. to 1,605° C., followed by smelting to obtain a second molten iron with an S content of lower than or equal to 0.02%, a P content of lower than or equal to 0.10%, and a Si content of lower than or equal to 0.60%, where a stirrer is arranged at 1,660 mm to 1,680 mm below a level of the first molten iron and the KR stirring process is performed for 15 min to 25 min at a rotational speed of 115 rpm to 130 rpm; and preferably, the raw steel includes the following components in the following contents: C: 0.19% to 0.32%, Cr: 1.95% to 2.30%, Ti: 0.92% to 1.20%, Mn: 0.19% to 0.22%, Ni: 0.40% to 0.45%, Al: 0.07% to 0.11%, Nb: 0.28% to 0.31%, P: 0.008% to 0.030%, V: 0.17% to 0.20%, S: 0.01% to 0.03%, Si: 0.37% to 0.58%, and Fe: the balance;

step S1.2, feeding the second molten iron into a converter, followed by smelting at 1,650° C. to 1,690° C. for 80 min to 130 min to produce a molten steel with a P content of lower than or equal to 0.03%;

step S1.3, transferring the molten steel to a ladle furnace (LF) for argon-blowing refining, deoxidation, and impurity removal at 1,610° C. to 1,630° C., and adding an alloy containing each of the respective components to allow the contents of the respective components to reach predetermined values, so as to obtain a refined molten steel with an S content of lower than or equal to 0.01%, where preferably, the predetermined values are as follows: Si: 0.35% to 0.60%, Cr: 1.62% to 2.35%, V: 0.15% to 0.21%, Nb: 0.27% to 0.32%, Ti: 0.78% to 1.21%, C: 0.15% to 0.20%, Ni: 0.39% to 0.48%, Mn: 0.18% to 0.23%, and Fe: the balance; and preferably, the alloy containing each of the respective components is an alloy of each of the respective components with iron; and step S1.4, placing the refined molten steel in a refining vacuum furnace, stirring the refined molten steel for 35 min to 55 min at 1,615° C. to 1,630° C. under a vacuum with a vacuum degree of 50 Pa to 100 Pa at a flow rate of a circulation pipe of 100 NM³/h to 118 NM³/h, adding an Al as a deoxidizing agent for the deoxidation at an amount allowing an Al content in the refined molten steel to be 0.12% to 0.15%, followed by soft stirring for 30 min to 60 min to obtain the casting molten steel.

In some embodiments, the continuous casting in the step S2 includes: transferring the casting molten steel to a continuous casting machine; setting a casting speed to 0.52 m/min to 0.64 m/min and a casting starting temperature to 1,520° C. to 1,535° C.; after the casting molten steel flows into a mold, turning on an electric pulse transmitter, and setting parameters of the electric pulse transmitter as follows: a voltage: 2,500 V to 2,600 V, a frequency: 0.80 Hz to 0.88 Hz, and a capacitance: 180 μF to 200 μF; and after the solidification, pulling a product out to obtain the continuous casting billet.

In the continuous casting of the present disclosure, the electric pulse-based crystallization is performed at the voltage of 2,500 V to 2,600 V, the frequency of 0.80 Hz to 0.88 Hz, and the capacitance of 180 μF to 200 μF, such that the growth orientation and distribution of grains and the segregation of alloying elements change periodically, which can guarantee the formation of corrugated grain boundaries from the perspective of dynamics. Further, obvious corrugated grain boundaries can be formed through the following 4 rolling passes of rough rolling and 3 rolling passes of finish rolling with controlled reductions and temperatures.

In some embodiments, the rolling in the step S3 includes:

step S3.1, introducing the continuous casting billet into a rough rolling mill for the rough rolling, so as to obtain a rough-rolled billet, where the rough rolling includes transverse rolling in two transverse rolling passes with reductions of 25% to 28% and 20% to 22% respectively at a rolling temperature of 1,200° C. to 1,275° C., and longitudinal rolling in two longitudinal rolling passes with reductions of 16% to 19% and 13% to 15% respectively at a rolling temperature of 1,100° C. to 1,200° C.; and step S3.2, introducing the rough-rolled billet into a finish rolling mill for the finish rolling in three rolling passes with reductions of 12% to 14%, 10% to 12%, and 8% to 10% respectively at a rolling temperature of 850° C. to 1,050° C., so as to obtain the finish-rolled billet.

The electric pulse-based crystallization and the 4 rolling passes of rough rolling and 3 rolling passes of finish rolling with controlled reductions and temperatures in the present disclosure can enhance the cross-slip of dislocations, achieve the formation of a wavy dislocation morphology, and enhance the twinning deformation. As a result, a high dislocation density is produced inside grains and a grain surface has a corrugated grain boundary, which can inhibit the nucleation and expansion of voids during a periodic vibration process of the material due to wind vibration, reduce the stress concentration and void size inside the material, and achieve a prominent fatigue resistance. In addition, the corrugated grain boundary achieves a small misorientation between two neighbouring grains and reduces a grain boundary energy, which can effectively prevent the expansion of dislocations and the grain boundary sliding and thus further improve the fatigue resistance of the material.

In some embodiments, the post-rolling treatment in the step S4 includes: placing the finish-rolled billet at 800° C. to 850° C. quickly in a slow cooling pit and sealing the finish-rolled billet with a sealing cover for slow cooling at a first cooling rate of 8° C./h to 9° C./h for 7 h to 8 h; opening the sealing cover halfway for further cooling at a second cooling rate of 15° C./h to 20° C./h for 7 h to 8 h; opening the sealing cover completely for ventilation and cooling at a third cooling rate of 40° C./h to 50° C./h; and when a temperature of the finish-rolled billet is lower than 280° C., taking the finish-rolled billet out of the slow cooling pit, and air-cooling the finish-rolled billet to a room temperature to obtain the fatigue-resistant load-bearing steel.

A second aspect of the present disclosure provides a fatigue-resistant load-bearing steel manufactured by the manufacturing method described above.

In some embodiments, the fatigue-resistant load-bearing steel includes the following components in the following contents: C: 0.15% to 0.20%, Cr: 1.62% to 2.35%, Ti: 0.78% to 1.21%, Mn: 0.18% to 0.23%, Ni: 0.39% to 0.48%, Al: 0.12% to 0.15%, V: 0.15% to 0.21%, Nb: 0.27% to 0.32%, Si: 0.35% to 0.60%, S: less than or equal to 0.01%, P: less than or equal to 0.03%, and Fe: the balance.

A third aspect of the present disclosure provides a use of the fatigue-resistant load-bearing steel described above in a wind turbine load-bearing component or a wind turbine main shaft.

The present disclosure has the following advantages.

1. In the present disclosure, a specific microstructure can be formed through composition and process control. The steel of the present disclosure includes the following components in mass percentage: V: 0.15% to 0.21%, Ti: 0.78% to 1.21%, Nb: 0.27% to 0.32%, and Cr: 1.62% to 2.35%. V, Ti, Nb, and Cr are all alloying elements with lower environment-sensitive embedding energies. From the perspective of thermodynamics, V, Ti, Nb, and Cr are liable to segregate at defects such as dislocation lines and interfaces, and thus a Cottrell atmosphere is very easily formed, which plays a dragging role in the grain boundary migration. The electric pulse-based crystallization is performed at the voltage of 2,500 V to 2,600 V, the frequency of 0.80 Hz to 0.88 Hz, and the capacitance of 180 μF to 200 μF, such that the growth orientation and distribution of grains and the segregation of alloying elements change periodically, which can guarantee the formation of corrugated grain boundaries from the perspective of dynamics. As a result, obvious corrugated grain boundaries can be formed through 4 rolling passes of rough rolling and 3 rolling passes of finish rolling with controlled reductions and temperatures. The electric pulse-based crystallization and the 4 rolling passes of rough rolling and 3 rolling passes of finish rolling with controlled reductions and temperatures can enhance the cross-slip of dislocations, allow the formation of a wavy dislocation morphology, and enhance the twinning deformation, such that a high dislocation density is produced inside grains.
2. The grain surface of the fatigue-resistant load-bearing steel manufactured by the manufacturing method of the present disclosure has a corrugated grain boundary, which can inhibit the nucleation and expansion of voids during a periodic vibration process of the material due to wind vibration, reduce the stress concentration and void size inside the material, and achieve a prominent fatigue resistance. In addition, the corrugated grain boundary achieves a small misorientation between two neighbouring grains and reduces a grain boundary energy, which can effectively prevent the expansion of dislocations and the grain boundary sliding and thus further improve the fatigue resistance of the material.
3. There is a high dislocation density of $4.8 \times 10^{14}$ m$^{-2}$ to $5.5 \times 10^{14}$ m$^{-2}$ inside grains of the fatigue-resistant load-bearing steel of the present disclosure. During the wind vibration process, the interaction between dislocations and the Cottrell atmosphere formed can play a significant deformation strengthening role for the material and achieve a prominent fatigue resistance.

BRIEF DESCRIPTION OF THE DRAWINGS

Figure is a metallograph illustrating a microstructure of the fatigue-resistant load-bearing steel manufactured in Example 1 of the present disclosure.

DETAILED DESCRIPTION OF THE EMBODIMENTS

In order to make the objectives, technical solutions, and advantages of the examples of the present disclosure clear, the technical solutions in the examples of the present disclosure will be clearly and completely described below with reference to the examples of the present disclosure. Apparently, the described examples are some rather than all of the examples of the present disclosure. All other examples obtained by a person of ordinary skill in the art based on the examples of the present disclosure without creative efforts shall fall within the protection scope of the present disclosure.

Unless otherwise specified, the experimental materials, reagents, or the like used in the following examples are all commercially available. If specific techniques or conditions are not specified in the examples, a process can be performed in accordance with the conventional techniques or conditions disclosed in the art.

In the following examples and comparative examples, respective components of the selected raw steel and contents thereof are as follows: C: 0.19% to 0.32%, Cr: 1.95% to 2.30%, Ti: 0.92% to 1.20%, Mn: 0.19% to 0.22%, Ni: 0.40% to 0.45%, Al: 0.07% to 0.11%, Nb: 0.28% to 0.31%, V: 0.17% to 0.20%, Si: 0.37% to 0.58%, an impurity P: 0.008% to 0.030%, an impurity S: 0.01% to 0.03%, and Fe: the balance.

Example 1

Step S1: Smelting:
  Step S1.1: A raw steel was pre-desulfurized by a KR stirring process at 1,575° C., and was smelted to finally produce a molten iron with an S content of lower than or equal to 0.02%, a P content of lower than or equal to 0.10%, and a Si content of lower than or equal to 0.60%. During the KR stirring process, a stirrer was arranged at 1,660 mm below a level of the molten iron and the KR stirring process was performed for 15 min at a rotational speed of 115 rpm.
  Step S1.2: The molten iron was fed into a converter, and was smelted at 1,650° C. for 80 min to produce a molten steel with a P content of lower than or equal to 0.03%.
  Step S1.3: The molten steel was transferred to an LF for argon-blowing refining, deoxidation, desulfurization, and impurity removal at 1,610° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.35%, Cr: 1.62%, V: 0.15%, Nb: 0.27%, Ti: 0.78%, C: 0.15%, Ni: 0.39%, Mn: 0.18%, and Fe: the balance.
  Step S1.4: The refined molten steel was placed in a refining vacuum furnace and stirred for 35 min at 1,615° C. under a vacuum with a vacuum degree of 50 Pa, during which a flow rate of a circulation pipe was 100 NM$^3$/h, Al was added as a deoxidizing agent for deoxidation at an amount allowing an Al content in the refined molten steel to be 0.12%, and soft stirring was performed for 30 min to obtain a casting molten steel.
Step S2: Continuous casting: The casting molten steel was transferred to a continuous casting machine. A casting speed was set to 0.52 m/min and a casting starting temperature was set to 1,520° C. After the casting molten steel flowed into a mold, an electric pulse transmitter was turned on, and parameters of the electric pulse transmitter were set as follows: a voltage: 2,500 V, a frequency: 0.80 Hz, and a capacitance: 180 μF. After solidification, a product was pulled out to obtain a continuous casting billet.
Step S3: Rolling:
  Step S3.1: The continuous casting billet was introduced into a rough rolling mill for rough rolling under the following conditions: two transverse rolling passes with reductions of 25% and 20% respectively at a rolling temperature of 1,200° C., and two longitudinal rolling passes with reductions of 16% and 13% respectively at a rolling temperature of 1,100° C., so as to obtain a rough-rolled billet.
  Step S3.2: The rough-rolled billet was introduced into a finish rolling mill for finish rolling under the following conditions: three rolling passes with reductions of 12%, 10%, and 8% respectively at a rolling temperature of 850° C., so as to obtain a finish-rolled billet.

Step S4: Post-rolling treatment: The finish-rolled billet at 800° C. was placed quickly in a slow cooling pit and sealed with a sealing cover for slow cooling at a cooling rate of 8° C./h for 7 h. Then, the sealing cover was opened halfway for further cooling at a cooling rate of 15° C./h for 7 h. Finally, the sealing cover was opened completely for ventilation and cooling at a cooling rate of 40° C./h. When a temperature of the finish-rolled billet was lower than 280° C., the finish-rolled billet was taken out of the slow cooling pit and air-cooled to room temperature to obtain a fatigue-resistant load-bearing steel.

Example 2

Step S1: Smelting:

Step S1.1: A raw steel was pre-desulfurized by a KR stirring process at 1,580° C., and was smelted to finally produce a molten iron with an S content of lower than or equal to 0.02%, a P content of lower than or equal to 0.10%, and a Si content of lower than or equal to 0.60%. During the KR stirring process, a stirrer was arranged at 1,670 mm below a level of the molten iron and the KR stirring process was performed for 20 min at a rotational speed of 120 rpm.

Step S1.2: The molten iron was fed into a converter, and was smelted at 1,680° C. for 90 min to produce a molten steel with a P content of lower than or equal to 0.03%.

Step S1.3: The molten steel was transferred to an LF for argon-blowing refining, deoxidation, desulfurization, and impurity removal at 1,620° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.40%, Cr: 2.0%, V: 0.19%, Nb: 0.3%, Ti: 1.0%, C: 0.18%, Ni: 0.4%, Mn: 0.2%, and Fe: the balance.

Step S1.4: The refined molten steel was placed in a refining vacuum furnace and stirred for 40 min at 1,620° C. under a vacuum with a vacuum degree of 80 Pa, during which a flow rate of a circulation pipe was 115 $NM^3$/h, Al was added as a deoxidizing agent for deoxidation at an amount allowing an Al content in the refined molten steel to be 0.13%, and soft stirring was performed for 40 min to obtain a casting molten steel.

Step S2: Continuous casting: The casting molten steel was transferred to a continuous casting machine. A casting speed was set to 0.60 m/min and a casting starting temperature was set to 1,530° C. After the casting molten steel flowed into a mold, an electric pulse transmitter was turned on, and parameters of the electric pulse transmitter were set as follows: a voltage: 2,550 V, a frequency: 0.85 Hz, and a capacitance: 190 μF. After solidification, a product was pulled out to obtain a continuous casting billet.

Step S3: Rolling:

Step S3.1: The continuous casting billet was introduced into a rough rolling mill for rough rolling under the following conditions: two transverse rolling passes with reductions of 27% and 21% respectively at a rolling temperature of 1,260° C., and two longitudinal rolling passes with reductions of 17% and 14% respectively at a rolling temperature of 1,150° C., so as to obtain a rough-rolled billet.

Step S3.2: The rough-rolled billet was introduced into a finish rolling mill for finish rolling under the following conditions: three rolling passes with reductions of 13%, 11%, and 9% respectively at a rolling temperature of 900° C., so as to obtain a finish-rolled billet.

Step S4: Post-rolling treatment: The finish-rolled billet at 830° C. was placed quickly in a slow cooling pit and sealed with a sealing cover for slow cooling at a cooling rate of 8° C./h for 7.5 h. The sealing cover was opened halfway for further cooling at a cooling rate of 18° C./h for 7.58 h. Finally, the sealing cover was opened completely for ventilation and cooling at a cooling rate of 45° C./h. When a temperature of the finish-rolled billet was lower than 280° C., the finish-rolled billet was taken out of the slow cooling pit and air-cooled to room temperature to obtain a fatigue-resistant load-bearing steel.

Example 3

Step S1: Smelting:

Step S1.1: A raw steel was pre-desulfurized by a KR stirring process at 1,605° C., and was smelted to finally produce a molten iron with an S content of lower than or equal to 0.02%, a P content of lower than or equal to 0.10%, and a Si content of lower than or equal to 0.60%. During the KR stirring process, a stirrer was arranged at 1680 mm below a level of the molten iron and the KR stirring process was performed for 25 min at a rotational speed of 130 rpm.

Step S1.2: The molten iron was fed into a converter, and was smelted at 1,690° C. for 130 min to produce a molten steel with a P content of lower than or equal to 0.03%.

Step S1.3: The molten steel was transferred to an LF for argon-blowing refining, deoxidation, desulfurization, and impurity removal at 1,630° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.60%, Cr: 2.35%, V: 0.21%, Nb: 0.32%, Ti: 1.21%, C: 0.20%, Ni: 0.48%, Mn: 0.23%, and Fe: the balance.

Step S1.4: The refined molten steel was placed in a refining vacuum furnace and stirred for 55 min at 1,630° C. under a vacuum with a vacuum degree of 100 Pa, during which a flow rate of a circulation pipe was 118 $NM^3$/h, Al was added as a deoxidizing agent for deoxidation at an amount allowing an Al content in the refined molten steel to be 0.15%, and soft stirring was performed for 60 min to obtain a casting molten steel.

Step S2: Continuous casting: The casting molten steel was transferred to a continuous casting machine. A casting speed was set to 0.64 m/min and a casting starting temperature was set to 1,535° C. After the casting molten steel flowed into a mold, an electric pulse transmitter was turned on, and parameters of the electric pulse transmitter were set as follows: a voltage: 2,600 V, a frequency: 0.88 Hz, and a capacitance: 200 µF. After solidification, a product was pulled out to obtain a continuous casting billet.

Step S3: Rolling:
  Step S3.1: The continuous casting billet was introduced into a rough rolling mill for rough rolling under the following conditions: two transverse rolling passes with reductions of 28% and 22% respectively at a rolling temperature of 1,275° C., and two longitudinal rolling passes with reductions of 19% and 15% respectively at a rolling temperature of 1,200° C., so as to obtain a rough-rolled billet.
  Step S3.2: The rough-rolled billet was introduced into a finish rolling mill for finish rolling under the following conditions: three rolling passes with reductions of 14%, 12%, and 10% respectively at a rolling temperature of 1,050° C., so as to obtain a finish-rolled billet.
Step S4: Post-rolling treatment: The finish-rolled billet at 850° C. was placed quickly in a slow cooling pit and sealed with a sealing cover for slow cooling at a cooling rate of 9° C./h for 8 h. The sealing cover was opened halfway for further cooling at a cooling rate of 20° C./h for 8 h. Finally, the sealing cover was opened completely for ventilation and cooling at a cooling rate of 50° C./h. When a temperature of the finish-rolled billet was lower than 280° C., the finish-rolled billet was taken out of the slow cooling pit and air-cooled to room temperature to obtain a fatigue-resistant load-bearing steel.

Example 4

Step S1: Smelting:
  Step S1.1: A raw steel was pre-desulfurized by a KR stirring process at 1,575° C., and was smelted to finally produce a molten iron with an S content of lower than or equal to 0.02%, a P content of lower than or equal to 0.10%, and a Si content of lower than or equal to 0.60%. During the KR stirring process, a stirrer was arranged at 1,680 mm below a level of the molten iron and the KR stirring process was performed for 25 min at a rotational speed of 130 rpm.
  Step S1.2: The molten iron was fed into a converter, and was smelted at 1,650° C. for 130 min to produce a molten steel with a P content of lower than or equal to 0.03%.
  Step S1.3: The molten steel was transferred to an LF for argon-blowing refining, deoxidation, desulfurization, and impurity removal at 1,630° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.60%, Cr: 1.62%, V: 0.15%, Nb: 0.32%, Ti: 0.78%, C: 0.20%, Ni: 0.39%, Mn: 0.23%, and Fe: the balance.
  Step S1.4: The refined molten steel was placed in a refining vacuum furnace and stirred for 55 min at 1,630° C. under a vacuum with a vacuum degree of 100 Pa, during which a flow rate of a circulation pipe was 100 NM$^3$/h, Al was added as a deoxidizing agent for deoxidation at an amount allowing an Al content in the refined molten steel to be 0.12%, and soft stirring was performed for 50 min to obtain a casting molten steel.
  Step S2: Continuous casting: The casting molten steel was transferred to a continuous casting machine. A casting speed was set to 0.64 m/min and a casting starting temperature was set to 1,535° C. After the casting molten steel flowed into a mold, an electric pulse transmitter was turned on, and parameters of the electric pulse transmitter were set as follows: a voltage: 2,500 V, a frequency: 0.88 Hz, and a capacitance: 200 µF. After solidification, a product was pulled out to obtain a continuous casting billet.

Step S3: Rolling:
  Step S3.1: The continuous casting billet was introduced into a rough rolling mill for rough rolling under the following conditions: two transverse rolling passes with reductions of 28% and 20% respectively at a rolling temperature of 1,275° C., and two longitudinal rolling passes with reductions of 19% and 14% respectively at a rolling temperature of 1,200° C., so as to obtain a rough-rolled billet.
  Step S3.2: The rough-rolled billet was introduced into a finish rolling mill for finish rolling under the following conditions: three rolling passes with reductions of 12%, 12%, and 10% respectively at a rolling temperature of 1,050° C., so as to obtain a finish-rolled billet.
Step S4: Post-rolling treatment: The finish-rolled billet at 850° C. was placed quickly in a slow cooling pit and sealed with a sealing cover for slow cooling at a cooling rate of 8° C./h for 7 h. The sealing cover was opened halfway for further cooling at a cooling rate of 20° C./h for 7 h. Finally, the sealing cover was opened completely for ventilation and cooling at a cooling rate of 50° C./h. When a temperature of the finish-rolled billet was lower than 280° C., the finish-rolled billet was taken out of the slow cooling pit and air-cooled to room temperature to obtain a fatigue-resistant load-bearing steel.

Example 5

Step S1: Smelting:
  Step S1.1: A raw steel was pre-desulfurized by a KR stirring process at 1,600° C., and was smelted to finally produce a molten iron with an S content of lower than or equal to 0.02%, a P content of lower than or equal to 0.10%, and a Si content of lower than or equal to 0.60%. During the KR stirring process, a stirrer was arranged at 1,675 mm below a level of the molten iron and the KR stirring process was performed for 23 min at a rotational speed of 125 rpm.
  Step S1.2: The molten iron was fed into a converter, and was smelted at 1,685° C. for 110 min to produce a molten steel with a P content of lower than or equal to 0.03%.
  Step S1.3: The molten steel was transferred to an LF for argon-blowing refining, deoxidation, desulfurization, and impurity removal at 1,625° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.55%, Cr: 2.1%, V: 0.19%, Nb: 0.3%, Ti: 1.1%, C: 0.18%, Ni: 0.47%, Mn: 0.21%, and Fe: the balance.

Step S1.4: The refined molten steel was placed in a refining vacuum furnace and stirred for 45 min at 1,628° C. under a vacuum with a vacuum degree of 70 Pa, during which a flow rate of a circulation pipe was 110 NM³/h, Al was added as a deoxidizing agent for deoxidation at an amount allowing an Al content in the refined molten steel to be 0.13%, and soft stirring was performed for 50 min to obtain a casting molten steel.

Step S2: Continuous casting: The casting molten steel was transferred to a continuous casting machine. A casting speed was set to 0.62 m/min and a casting starting temperature was set to 1,532° C. After the casting molten steel flowed into a mold, an electric pulse transmitter was turned on, and parameters of the electric pulse transmitter were set as follows: a voltage: 2,580 V, a frequency: 0.87 Hz, and a capacitance: 195 μF. After solidification, a product was pulled out to obtain a continuous casting billet.

Step S3: Rolling:

Step S3.1: The continuous casting billet was introduced into a rough rolling mill for rough rolling under the following conditions: two transverse rolling passes with reductions of 27% and 21% respectively at a rolling temperature of 1,270° C., and two longitudinal rolling passes with reductions of 18% and 14% respectively at a rolling temperature of 1,160° C., so as to obtain a rough-rolled billet.

Step S3.2: The rough-rolled billet was introduced into a finish rolling mill for finish rolling under the following conditions: three rolling passes with reductions of 13%, 12%, and 9% respectively at a rolling temperature of 1,000° C., so as to obtain a finish-rolled billet.

Step S4: Post-rolling treatment: The finish-rolled billet at 830° C. was placed quickly in a slow cooling pit and sealed with a sealing cover for slow cooling at a cooling rate of 9° C./h for 8 h. The sealing cover was opened halfway for further cooling at a cooling rate of 20° C./h for 8 h. Finally, the sealing cover was opened completely for ventilation and cooling at a cooling rate of 50° C./h. When a temperature of the finish-rolled billet was lower than 280° C., the finish-rolled billet was taken out of the slow cooling pit and air-cooled to room temperature to obtain a fatigue-resistant load-bearing steel.

Comparative Example 1

A commercially available steel Q460 for wind turbine load-bearing components (the commercially available steel Q460 includes the following components in the following contents: C: 0.18%, Si: 0.55%, Mn: 1.5%, Nb: 0.05%, V: 0.13%, Cr: 0.3%, Ti: 0.05%, Ni: 0.8%, Cu: 0.38%, Mo: less than or equal to 0.15%, N: 0.015%, S: 0.03%, P: 0.03%, and Fe: the balance) was purchased and sampled.

Comparative Example 2 (compared with Example 1, electric pulse parameters for the continuous casting in the step S2 were adjusted to be beyond the parameter ranges defined in the claims of the present disclosure respectively.)

Step S1: Smelting. The step S1 was the same as the step S1 of Example 1.

Step S2: Continuous casting: The casting molten steel was transferred to a continuous casting machine. A casting speed was set to 0.52 m/min and a casting starting temperature was set to 1,520° C. After the casting molten steel flowed into a mold, an electric pulse transmitter was turned on, and parameters of the electric pulse transmitter were set as follows: a voltage: 1,000 V, a frequency: 2 Hz, and a capacitance: 150 μF. After solidification, a product was pulled out to obtain a continuous casting billet.

Step S3: Rolling. Step S4: Post-rolling treatment. The step S3 and the step S4 were the same as the step S3 and the step S4 of Example 1, respectively.

Comparative Example 3 (compared with Example 1, contents of the components V, Ti, Nb, and Cr during the smelting in the step S1 were adjusted to be beyond the content ranges defined in the claims of the present disclosure respectively.)

Step S1.1 and step S1.2 were the same as the step S1.1 and the step S1.2 in Example 1, respectively.

Step S1.3: The molten steel was transferred to an LF for argon-blowing refining, deoxidation, desulfurization, and impurity removal at 1,610° C. to obtain a refined molten steel with an S content of lower than or equal to 0.01%. During the argon-blowing refining, contents of respective components in the molten steel were detected, and according to the detection results, an alloy containing each of the respective components was added in the form of a ferroalloy of each of the respective components to allow the contents of the respective components to reach predetermined values as follows: Si: 0.35%, Cr: 0.5%, V: 0.5%, Nb: 0.7%, Ti: 0.3%, C: 0.15%, Ni: 0.39%, Mn: 0.18%, and Fe: the balance.

Step S1.4: The refined molten steel was placed in a refining vacuum furnace and stirred for 35 min at 1,615° C. under a vacuum with a vacuum degree of 50 Pa, during which a flow rate of a circulation pipe was 100 NM³/h, Al was added as a deoxidizing agent for deoxidation at an amount allowing an Al content in the refined molten steel to be 0.12%, and soft stirring was performed for 30 min to obtain a casting molten steel.

Step S2: Continuous casting. Step S3: Rolling. Step S4: Post-rolling treatment. The step S2, the step S3, and the step S4 were the same as the step S2, the step S3, and the step S4 of Example 1, respectively.

Comparative Example 4 (compared with Example 1, the rolling in the step S3 was adjusted to be other than the rolling defined in the claims of the present disclosure.)

Step S1: Smelting. Step S2: Continuous casting. The step S1 and the step S2 were the same as the step S1 and the step S2 of Example 1, respectively.

Step S3: Rolling:

Step S3.1: The continuous casting billet was introduced into a rough rolling mill for rough rolling under the following conditions: three transverse rolling passes with reductions of 10%, 15%, and 25% respectively at a rolling temperature of 1,150° C., and three longitudinal rolling passes with reductions of 25%, 8%, and 8% respectively at a rolling temperature of 1,250° C., so as to obtain a rough-rolled billet.

Step S3.2: The rough-rolled billet was introduced into a finish rolling mill for finish rolling under the following conditions: three rolling passes with reductions of 18%, 8%, and 5% respectively at a rolling temperature of 1,100° C., so as to obtain a finish-rolled billet.

Step S4: Post-rolling treatment: The finish-rolled billet at 800° C. was placed quickly in a slow cooling pit and sealed with a sealing cover for slow cooling at a cooling rate of 8° C./h for 7 h. The sealing cover was opened halfway for further cooling at a cooling rate of 15° C./h for 7 h. Finally, the sealing cover was opened completely for ventilation and cooling at a cooling rate of 40° C./h. When a temperature of the finish-rolled billet was lower than 280° C., the finish-rolled billet was taken out of the slow cooling pit and air-cooled to room temperature to obtain a load-bearing steel.

TEST EXAMPLE

The steels of Examples 1 to 3 and Comparative Examples 1 to 4 each were tested according to the following test methods:
1. Intragranular dislocation density test: An intragranular dislocation density was measured according to the method in the "Microbeam Analysis-Analytic Electron Microscopy-Method for Determining Dislocation Density in Thin Metallic Crystal Sample (GB/T 43088-2023)".
2. Mechanical property test: A tensile strength and an elongation were measured according to the method in "Tensile Test of Metal Material: Part 1: Test Method at Room Temperature (GB/T228.1-2021)".
3. Fatigue resistance test: A fatigue test was performed according to the method in "Metal Material-Fatigue Test-Axial Force Control Method (GB/T 3075-2021)".

Test data of the above steels is shown in Table 1 below:

TABLE 1

Test data of the steels in Examples 1 to 3 and Comparative Examples 1 to 4

| Sample | Grain boundary morphology | Intragranular dislocation density ($\times 10^{14}$ m$^{-2}$) | Mechanical properties | | Fatigue resistance | |
|---|---|---|---|---|---|---|
| | | | Tensile strength/MPa | Elongation/% | Fatigue strength/MPa | Number of cycles |
| Example 1 | Corrugated interface | 4.8 | 851 | 23.5% | 338.95 | $2.91 \times 10^{14}$ |
| Example 2 | Corrugated interface | 5.5 | 886 | 22.7% | 351.26 | $3.08 \times 10^{14}$ |
| Example 3 | Corrugated interface | 5.1 | 863 | 23.1% | 343.71 | $2.99 \times 10^{14}$ |
| Comparative Example 1 | No corrugated interface | 1.6 | 687 | 17.8% | 267.92 | $2.00 \times 10^{14}$ |
| Comparative Example 2 | No corrugated interface | 1.8 | 696 | 19.8% | 271.39 | $2.29 \times 10^{14}$ |
| Comparative Example 3 | No corrugated interface | 2.1 | 715 | 18.2% | 295.68 | $2.05 \times 10^{14}$ |
| Comparative Example 4 | No corrugated interface | 1.9 | 704 | 19.1% | 276.74 | $2.13 \times 10^{14}$ |

It can be seen from the data in Table 1 that the grain surface of the fatigue-resistant load-bearing steel manufactured by the manufacturing method of the present disclosure has a corrugated grain boundary. The corrugated grain boundary achieves a small misorientation between two neighbouring grains and reduces a grain boundary energy, which can effectively prevent the expansion of dislocations and the grain boundary sliding and thus further improve a fatigue resistance of the material. The fatigue-resistant load-bearing steel has an intragranular dislocation density of $4.8 \times 10^{14}$ m$^{-2}$ to $5.5 \times 10^{14}$ m$^{-2}$, a tensile strength of about 860 MPa, an elongation of about 23%, and a fatigue strength of about 345 MPa. The performance values of the fatigue-resistant load-bearing steel are much higher than the corresponding performance values of the commercial steel Q460 for wind turbine load-bearing components in the prior art provided in Comparative Example 1. During the wind vibration process, the interaction between intragranular high-density dislocations and the Cottrell atmosphere formed can play a significant deformation strengthening role for the material and achieve a prominent fatigue resistance.

The electric pulse parameters for the continuous casting in the step S2 of Comparative Example 2 are adjusted to be beyond the respective parameter ranges defined in the manufacturing method of the present disclosure. Accordingly, the corrugated interface is not formed, the intragranular dislocation density of Comparative Example 2 is much lower than the intragranular dislocation density of Example 1, and the mechanical properties of Comparative Example 2 are also lower than the mechanical properties of Example 1. This is because the electric pulse-based crystallization performed under the electric pulse parameters in the manufacturing method of the present disclosure makes the growth orientation and distribution of grains and the segregation of alloying elements change periodically, which can guarantee the formation of corrugated grain boundaries from the perspective of dynamics. As a result, obvious corrugated grain boundaries can be formed through the 4 rolling passes of rough rolling and 3 rolling passes of finish rolling with controlled reductions and temperatures.

The contents of the components V, Ti, Nb, and Cr during the smelting in the step S1 of Comparative Example 3 are adjusted to be beyond the respective content ranges defined in the manufacturing method of the present disclosure. Accordingly, the corrugated interface is not formed, the intragranular dislocation density of Comparative Example 3 is much lower than the intragranular dislocation density of Example 1, and the mechanical properties of Comparative Example 3 are also lower than the mechanical properties of Example 1, but the intragranular dislocation density and the mechanical properties of Comparative Example 3 are higher than the intragranular dislocation density and the mechanical properties of Comparative Example 1. This is because the present disclosure defines specified V, Ti, Nb, and Cr contents and the V, Ti, Nb, and Cr are all alloying elements with lower environment-sensitive embedding energies. From the perspective of thermodynamics, V, Ti, Nb, and Cr are liable to segregate at defects such as dislocation lines and interfaces, and thus a Cottrell atmosphere is very easily formed, which plays a dragging role in the grain boundary migration and thus enhances the mechanical properties and fatigue resistance of the steel.

The rolling in the step S3 of Comparative Example 4 is adjusted to be beyond the rolling method defined in the manufacturing method of the present disclosure. Accordingly, the corrugated interface is not formed, the intragranular dislocation density of Comparative Example 4 is much lower than the intragranular dislocation density of Example 1, and the mechanical properties of Comparative Example 4 are also lower than the mechanical properties of Example 1, but the intragranular dislocation density and the mechanical properties of Comparative Example 4 are higher than the intragranular dislocation density and the mechanical properties of Comparative Example 1. This is because the electric pulse-based crystallization and the 4 rolling passes of rough rolling and 3 rolling passes of finish rolling with controlled reductions and temperatures can enhance the cross-slip of dislocations, allow the formation of a wavy dislocation morphology, and enhance the twinning deformation to produce a high dislocation density inside grains. During the wind vibration process, the interaction between dislocations and the Cottrell atmosphere formed can play a significant deformation strengthening role in the material and achieve a prominent fatigue resistance.

The above are merely preferred specific implementations of the present disclosure, but the protection scope of the present disclosure is not limited thereto. Any equivalent replacement or modification made by a person skilled in the art according to the technical solutions of the present disclosure and inventive concepts thereof within the technical scope of the present disclosure shall fall within the protection scope of the present disclosure.

What is claimed is:

1. A manufacturing method of a fatigue-resistant load-bearing steel for a wind turbine main shaft, comprising the following steps:
    step S1, smelting: smelting a raw steel into a first molten iron, followed by impurity removal and deoxidation, and adjusting contents of respective components to obtain a casting molten steel, wherein the casting molten steel comprises the following respective components in the following contents: Al: 0.12% to 0.15%, Si: 0.35% to 0.60%, Cr: 1.62% to 2.35%, V: 0.15% to 0.21%, Ti: 0.78% to 1.21%, Nb: 0.27% to 0.32%, C: 0.15% to 0.20%, Ni: 0.39% to 0.48%, Mn: 0.18% to 0.23%, and Fe: the balance;
    step S2, continuous casting: crystallizing the casting molten steel with an electric pulse, followed by solidification to obtain a continuous casting billet;
    step S3, rolling: subjecting the continuous casting billet to rough rolling and finish rolling sequentially to obtain a finish-rolled billet; and
    step S4, post-rolling treatment: cooling and then air-cooling the finish-rolled billet to obtain the fatigue-resistant load-bearing steel,
    wherein the continuous casting in the step S2 comprises transferring the casting molten steel to a continuous casting machine with a casting speed being set to 0.52 m/min to 0.64 m/min and a casting starting temperature being set to 1,520° C. to 1,535° C., and turning on an electric pulse transmitter with parameters being set as follows: a voltage: 2,500 V to 2,600 V, a frequency: 0.80 Hz to 0.88 Hz, and a capacitance: 180 μF to 200 μF, so as to obtain the continuous casting billet after the solidification;
    the rolling in the step S3 comprises:
    step S3.1, introducing the continuous casting billet into a rough rolling mill for the rough rolling, so as to obtain a rough-rolled billet, wherein the rough rolling comprises transverse rolling in two transverse rolling passes with reductions of 25% to 28% and 20% to 22% respectively, and longitudinal rolling in two longitudinal rolling passes with reductions of 16% to 19% and 13% to 15% respectively, and the transverse rolling is performed at a first rolling temperature of 1,200° C. to 1,275° C. and the longitudinal rolling is performed at a second rolling temperature of 1,100° C. to 1,200° C.; and
    step S3.2, introducing the rough-rolled billet into a finish rolling mill for the finish rolling in three rolling passes with reductions of 12% to 14%, 10% to 12%, and 8% to 10% respectively, so as to obtain the finish-rolled billet, wherein the finish rolling is performed at a third rolling temperature of 850° C. to 1,050° C.

2. The manufacturing method of the fatigue-resistant load-bearing steel for the wind turbine main shaft according to claim 1, wherein the steps of the impurity removal and the deoxidation, and adjusting the contents of the respective components in the step S1 comprise the following steps:
    step S1.1, pre-desulfurizing the raw steel by a Kambara Reactor (KR) stirring process at 1,575° C. to 1,605° C., followed by smelting to obtain a second molten iron with an S content of lower than or equal to 0.02%, a P content of lower than or equal to 0.10%, and a Si content of lower than or equal to 0.60%;
    step S1.2, feeding the second molten iron into a converter, followed by smelting at 1,650° C. to 1,690° C. to produce a molten steel with a P content of lower than or equal to 0.03%;
    step S1.3, transferring the molten steel to a ladle furnace (LF) for argon-blowing refining, deoxidation, and impurity removal at 1,610° C. to 1,630° C., and adding an alloy containing each of the respective components to allow the contents of the respective components to reach predetermined values, so as to obtain a refined molten steel with an S content of lower than or equal to 0.01%; and
    step S1.4, placing the refined molten steel in a refining vacuum furnace, stirring the refined molten steel at 1,615° C. to 1,630° C. under a vacuum, and adding an Al for the deoxidation to obtain the casting molten steel.

3. The manufacturing method of the fatigue-resistant load-bearing steel for the wind turbine main shaft according to claim 1, wherein the post-rolling treatment in the step S4 comprises:
    step S4.1, placing the finish-rolled billet at 800° C. to 850° C. quickly in a cooling pit and sealing the finish-rolled billet with a sealing cover for cooling;
    step S4.2, opening the sealing cover halfway for further cooling at a first cooling rate of 15° C./hour to 20° C./hour for 7 hours to 8 hours; and
    step S4.3, opening the sealing cover completely for ventilation and cooling at a second cooling rate of 40° C./hour to 50° C./hour; and when a temperature of the finish-rolled billet is lower than 280° C., taking the finish-rolled billet out of the slow cooling pit, and air-cooling the finish-rolled billet to a room temperature to obtain the fatigue-resistant load-bearing steel.

4. The manufacturing method of the fatigue-resistant load-bearing steel for the wind turbine main shaft according to claim 3, wherein the cooling in the step S4.1 is performed at a third cooling rate of 8° C./hour to 9° C./hour for 7 hours to 8 hours.

5. The manufacturing method of the fatigue-resistant load-bearing steel for the wind turbine main shaft according to claim 1, wherein the fatigue-resistant load-bearing steel comprises the following components in the following contents:

C: 0.15% to 0.20%, Cr: 1.62% to 2.35%, Ti: 0.78% to 1.21%, Mn: 0.18% to 0.23%, Ni: 0.39% to 0.48%, Al: 0.12% to 0.15%, V: 0.15% to 0.21%, Nb: 0.27% to 0.32%, Si: 0.35% to 0.60%, S: less than or equal to 0.01%, P: less than or equal to 0.03%, and Fe: the balance.

6. The manufacturing method of the fatigue-resistant load-bearing steel for the wind turbine main shaft according to claim 5, wherein a grain boundary of the fatigue-resistant load-bearing steel has a typical corrugated interface.

7. The manufacturing method of the fatigue-resistant load-bearing steel for the wind turbine main shaft according to claim 6, wherein the fatigue-resistant load-bearing steel has an intragranular dislocation density of greater than or equal to $4.8 \times 10^{14}$ m$^{-2}$.

8. The manufacturing method of the fatigue-resistant load-bearing steel for the wind turbine main shaft according to claim 2, wherein the fatigue-resistant load-bearing steel comprises the following components in the following contents:

C: 0.15% to 0.20%, Cr: 1.62% to 2.35%, Ti: 0.78% to 1.21%, Mn: 0.18% to 0.23%, Ni: 0.39% to 0.48%, Al: 0.12% to 0.15%, V: 0.15% to 0.21%, Nb: 0.27% to 0.32%, Si: 0.35% to 0.60%, S: less than or equal to 0.01%, P: less than or equal to 0.03%, and Fe: the balance.

9. The manufacturing method of the fatigue-resistant load-bearing steel for the wind turbine main shaft according to claim 8, wherein a grain boundary of the fatigue-resistant load-bearing steel has a typical corrugated interface.

10. The manufacturing method of the fatigue-resistant load-bearing steel for the wind turbine main shaft according to claim 9, wherein the fatigue-resistant load-bearing steel has an intragranular dislocation density of greater than or equal to $4.8 \times 10^{14}$ m$^{-2}$.

11. The manufacturing method of the fatigue-resistant load-bearing steel for the wind turbine main shaft according to claim 3, wherein the fatigue-resistant load-bearing steel comprises the following components in the following contents:

C: 0.15% to 0.20%, Cr: 1.62% to 2.35%, Ti: 0.78% to 1.21%, Mn: 0.18% to 0.23%, Ni: 0.39% to 0.48%, Al: 0.12% to 0.15%, V: 0.15% to 0.21%, Nb: 0.27% to 0.32%, Si: 0.35% to 0.60%, S: less than or equal to 0.01%, P: less than or equal to 0.03%, and Fe: the balance.

12. The manufacturing method of the fatigue-resistant load-bearing steel for the wind turbine main shaft according to claim 11, wherein a grain boundary of the fatigue-resistant load-bearing steel has a corrugated interface.

13. The manufacturing method of the fatigue-resistant load-bearing steel for the wind turbine main shaft according to claim 12, wherein the fatigue-resistant load-bearing steel has an intragranular dislocation density of greater than or equal to $4.8 \times 10^{14}$ m$^{-2}$.

14. The manufacturing method of the fatigue-resistant load-bearing steel for the wind turbine main shaft according to claim 4, wherein the fatigue-resistant load-bearing steel comprises the following components in the following contents:

C: 0.15% to 0.20%, Cr: 1.62% to 2.35%, Ti: 0.78% to 1.21%, Mn: 0.18% to 0.23%, Ni: 0.39% to 0.48%, Al: 0.12% to 0.15%, V: 0.15% to 0.21%, Nb: 0.27% to 0.32%, Si: 0.35% to 0.60%, S: less than or equal to 0.01%, P: less than or equal to 0.03%, and Fe: the balance.

15. The manufacturing method of the fatigue-resistant load-bearing steel for the wind turbine main shaft according to claim 14, wherein a grain boundary of the fatigue-resistant load-bearing steel has a corrugated interface.

* * * * *